April 16, 1963      C. R. HUNT      3,085,535

BOAT HULL

Filed Aug. 24, 1959

United States Patent Office 3,085,535
Patented Apr. 16, 1963

3,085,535
BOAT HULL
Charles R. Hunt, Tilton, N.H., assignor to Hunt Industries, Inc., Boston, Mass., a corporation of Massachusetts
Filed Aug. 24, 1959, Ser. No. 835,786
4 Claims. (Cl. 114—56)

This invention relates to boat construction and more particularly to a novel high speed planing hull especially useful as an outboard motor driven hull for rough water operation.

The main object of the invention is to provide a boat hull which has inherent stability enabling it to be operated as a planing hull in rough water conditions, even with large variations in boat load. At the same time, the invention provides a hull which may be automatically ballasted for low speed operation, yet remain a lightweight hull in high speed operation, as is essential in a planing hull, as well as one of simple and economical construction.

In general, the invention provides a high speed outboard motor driven planing boat hull of the type known as V bottom with a single central stem and transom stern, but, unlike the heretofore known boat hulls of that type, the bottom is stepless and the V angle is straight-sided and uniform throughout the entire run of the hull, except at the bow where it becomes increasingly acute and marges into the stem. Furthermore, the chine, that is, the juncture of the bottom with the top sides, is substantially straight in side elevation and is positioned unusually high on the hull, well above the normal displacement waterline, that is, the waterline with the hull floating at rest with a normal load, of the hull throughout its entire length, preferably by a distance of about half of the vertical dimension of the lower hull portion. Again, this is to be contrasted with the heretofore known V bottom hulls wherein the chine, except at the bow of the hull, was positioned at or below the waterline.

Practical experimentation with the hull of the present invention under actual operating conditions has demonstrated that high speed planing operation may be maintained under rough water conditions, even when the boat is being driven in the same direction as the seas, the most difficult condition. This surprising result is believed to be due to the straight and uniform under water run presented by the hull of the invention, so that even when the hull has rolled somewhat from an upright position, the submerged sections remain of uniform cross-section along the length of the run and so do not cause yawing as would otherwise be the case, wherein the cross-section of one hull section differed from that of a succeeding section. The high chine is necessary to produce this desirable result, however, as well as the uniform V angle, since, if a chine is submerged to any substantial extent as by rolling, it will provide non-uniform submerged sections along the curved side of the boat and so cause yaw. In addition, the high chine allows considerable variation in the loading of the hull of the invention without danger of submerging the chine even during the inevitable rolling which will cause yaw, as explained above.

Additionally, in order to provide high stability in low speed operation of a hull carrying an outboard motor, a unique ballast system is provided whereby the hull is automatically ballasted at low hull speeds by filling a longitudinally extending narrow, centrally located tunnel along its bottom with sea water, such being automatically emptied at higher speeds to provide the lightweight hull necessary for planing operation. The ballasting may also be controlled manually, if desired.

For the purpose of further explaining the present invention, reference is now made to the following description of a preferred embodiment thereof, together with the accompanying drawings, wherein.

Figure 1:
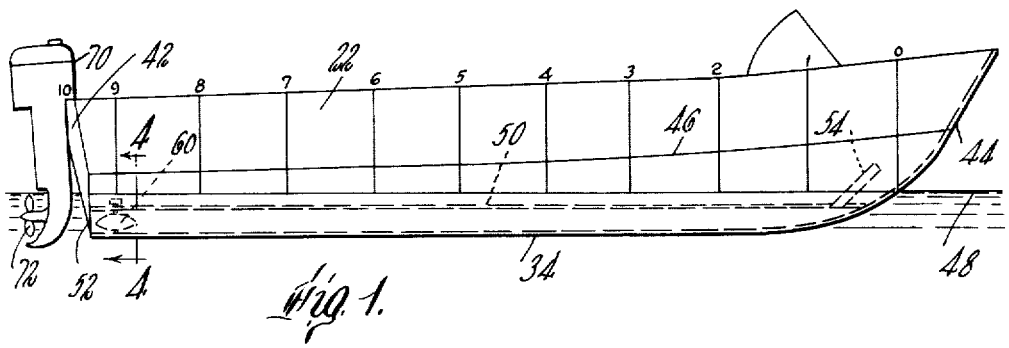
FIG. 1 is an overall side elevation of the boat hull of the invention.

Referring to the drawings, the high speed rough water outboard driven planing boat hull of the invention in general includes an upper hull portion having generally vertical flat sides 22 curved longitudinally from bow to stern and a generally V shaped lower hull portion having flat sides 32, all joined at the rear end or stern by a substantially vertical flat transom 42 and at the forward end or bow by a central sloping stem 44, with the lower hull portion sides 32 joined at a suitable keel 34. The cross-sectional juncture or chine 46 between the upper and lower hull portions in its side elevation is substantially a straight line throughout the length of the hull, although having a slight sheer with the forward end thereof somewhat higher than the rear end. Also, the sides 32 are generally straight in section to provide straight external hull lines except close to keel 34.

Figure 2:
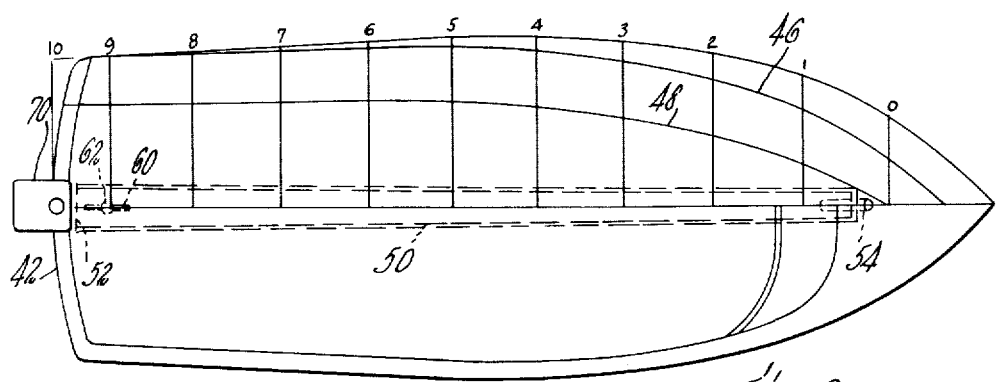
FIG. 2 is a composite plan view of the boat of FIG. 1 showing on its bottom half a plan of the hull structure and on its top half the section lines thereof.
Figure 3:
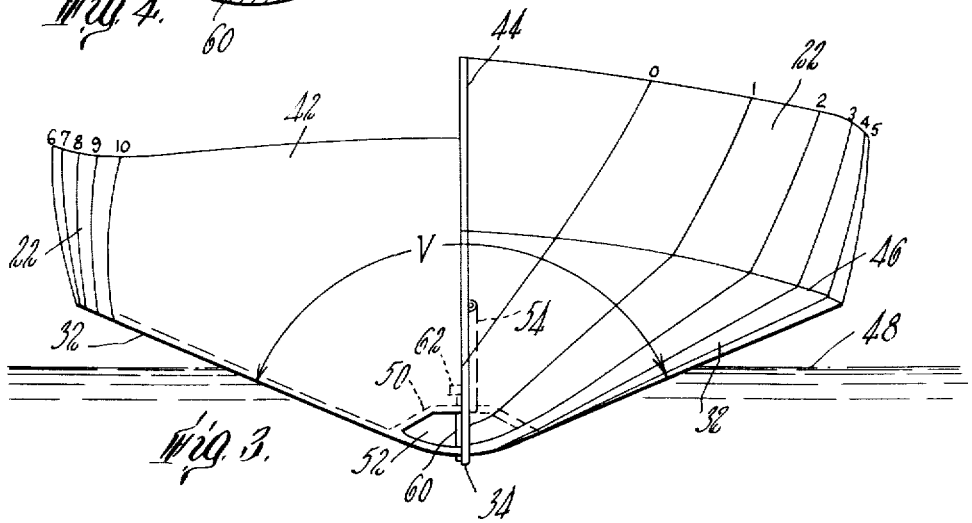
FIG. 3 is an enlarged diagrammatic view of the hull of FIGS. 1 and 2 showing on its right side the section lines thereof from the bow aft, and on its left side the section lines thereof from the stern forward.

As will be seen in FIGS. 2 and 3 of the drawings, the hull has substantial beam in relation to its length. In the illustrative embodiment the ratio of overall length to maximum beam is somewhat less than three, while for larger boats the length/beam ratio may be somewhat greater than three.

In accordance with the principles of the present invention, it is important that chine 46 be located a substantial distance above the normal displacement waterline of the hull, preferably about half the vertical dimension of the lower hull portion, so that it is maintained well out of water above waterline 48 at all times, even when the hull has rolled to a considerable extent, and that the lower hull portion sides 32 have a uniform included angle throughout the major portion of the length of the hull as measured along waterline 48. This may best be seen in FIG. 3 of the drawings wherein the transverse sections, also shown in FIGS. 1 and 2, are numbered 0 through 10 and show transverse hull sections taken at ten equal intervals along the length of the hull. Thus, as shown, the lower hull portion has an included straight-sided angle V of about 130 degrees, corresponding to a deadrise angle (the angle which the bottom section makes to the horizontal) of approximately 25 degrees. Such angle is uniform for at least the rear two-thirds of the normal displacement waterline length of the hull, that is, at hull sections 3 through 10, but progressively decreases in the forward third thereof, that is, from hull sections 3 to 0, to merge into sloping stem 44 to provide a desirable entrance. As a practical matter, although it is important the the included angle V be uniform along the major portion of the hull, particularly toward the stern, since it is mainly the rearward two-thirds of the hull which supports it on planing operation. the angle may vary with different hulls. Such variation may include angles from about 110 to 150 degrees, corresponding to a deadrise angle of between about 35 degrees and approximately 15 degrees, and the straight sides of the V may similarly vary within such angles, the flatness of the angle V being limited by the undesirable pounding that tends to occur in rough water with hulls having too flat an angle V and the steepness of said angle being limited by the inability to plane of a hull having too steep an angle V.

The upper hull portion is less important than is the lower hull portion, since it is never submerged in any normal operation, and consists of the generally vertical flat sides 22 longitudinally curved inward from section 6 aft to transom 42 and inward from section 5 forward to stem 44 so that a generally conventional hull in plan view is formed with its greatest beam generally amidships and with a pointed bow. However, in order to provide desirable buoyancy and other characteristics, the forward third of each of upper hull portion sides 22 is flared outwardly along its upper edge, say from section 3 forward to stem 44, although the straight external hull lines of sides 22 are nevertheless maintained.

To provide automatic ballasting for low speed operation, a longitudinally extending narrow, centrally located tunnel 50 is provided along the bottom of the hull, such tunnel communicating through the transom 42 by its open rearward end 52 and having a vent tube 54 located within the hull at the otherwise closed forward end of the tunnel with its open upper end located well above the waterline of the hull under any load conditions. Normally, the upper wall of the tunnel is located below the waterline 48 of the hull at rest, so that the tunnel 50 will readily fill entirely with water when the hull is at rest or moving at low speed. To provide adequate ballasting, the tunnel should extend for substantially the length of the hull generally centrally thereof and be of dimensions sufficient to contain a weight of water of a substantial fraction of the weight of the hull, say of from about 25% to 100% of the weight of the empty hull without its motor, and, preferably, about 60% thereof.

For manual control of the ballasting, if desired, a valve may be located in the tunnel adjacent the transom 42, such valve consisting of a plate 60 mounted for rotation about a central vertical axis by a handle 62.

From a constructional standpoint, the hull may be constructed in any one of a number of ways conventional in the boat building art, as by conventional frames and planing, or with flat sheet material, such as plywood or metal, or by any of the well known plastic molding techniques. As a practical matter, a conventional outboard motor 70 driving a propeller 72 may be used to drive the hull, although inboard engines could be used as well. However, as pointed out above and shown in FIG. 4, the hull of the invention is particularly adapted to being driven by an outboard motor wherein the relatively high center of gravity creates problems of stability in conventional hulls.

In operation, the high speed planing hull of the invention may be used as any conventional planing power boat hull, but has greatly increased stability, particularly in its lack of tendency of yaw where running off before following or quartering seas. As above stated, this is believed to be due to the fact that the submerged sections of the hull remain substantially uniform along the length of the hull even when the hull is rolling. This situation is particuarly to be contrasted with a conventional V hull having its chine at or below water level and with the angle of its V sections flattening toward the stern of the hull until at the transom the boat is flat-bottomed. With such a hull, the submerged sections change radically along the length of the hull as the boat rolls, causing serious instability in yaw, and this is made worse by the presence of the chines which tend alternately to yaw the hull in opposite directions as the boat rolls to submerge first one chine and then the other.

Figure 4:
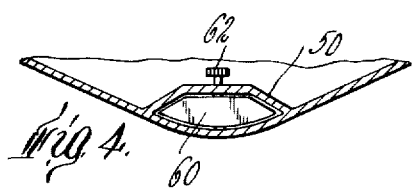
FIG. 4 is a cross-sectional detail view taken on the lines 4—4 of FIG. 1.

The automatic ballasting system of the invention is particularly useful in conjunction with the disclosed hull form when driven by an outboard motor or motors in order to provide high stability at low speeds, yet light weight for planing. Otherwise, the high chine and V bottom tend to let the hull rock rather to freely between the angles at which one chine or the other is submerged when a desirably light weight hull is used. In operation, the tunnel fills with water when the boat is at rest, water flowing in through at transom opening 52 and air escaping through vent pipe 54 until the tunnel is completely filled with water. This provides great stability, since, with a 16 foot boat, weighing, say, 600 pounds empty, the cubic capacity of the tunnel is such as to accommodate 400 pounds of water (at about 6 lbs./ft.$^3$). With the boat underway in dynamic operation, the water ballast flows from the tunnel as the speed is increased, and the dynamic stability of the hull makes the ballast provided by the water in the tunnel unnecessary. Outward flow of the ballast takes place readily both because the rising of the bow above the static waterline causes the water to flow by gravity from the tunnel, and because of the jet pump effect of the water moving along the bottom of the hull past the transom opening 52. Normally, for automatic ballasting, valve plate 62 is kept parallel to the longitudinal axis of the tunnel, as shown in FIGS. 1, 2 and 3, but it may be closed by rotating it at 90 degrees, as shown in FIG. 4, if to achieve maximum hull acceleration from rest it be desired to prevent tunnel 50 from filling.

Thus, it will be seen that the invention provides a novel high speed planning hull especially stable in rough water and with an automatic ballasting system for low speed stability. Various modifications of the invention within the spirit thereof and the scope of the appended claims will be apparent to those skilled in this art.

I claim:

1. A high speed planing boat hull comprising a generally vertical flat-sided upper hull portion and a generally V shaped flat-sided lower hull portion, the chine juncture between said hull portions lying substantially in a horizontal plane throughout the length thereof and being located above the normal displacement waterline of said hull, said lower hull portion having an included V angle between its sides of between about 110 and 150 degrees throughout the major portion of the normal displacement waterline length but progressively decreasing in the forward third thereof, and said upper hull portion flaring outwardly in the forward third thereof to merge with said lower hull portion at the stem of said hull to provide desirable entrance and buoyancy characteristics while maintaining a smooth run of substantially uniform cross-section of said hull for rough water stability during planing of said hull, and a water ballast tunnel having its top beneath the static waterline of said hull and extending generally centrally along said hull and open at the rearward end thereof with an air vent tube at its forward end having an open end above the static waterline of said hull, said tunnel being automatically filled with water through its open end from water outside said hull when said hull is at rest and being automatically emptied of said water in dynamic operation of said hull.

2. A high speed planing boat hull for outboard motor power comprising a generally vertical upper hull portion and a V shaped flat-sided lower hull portion joined by a substantially vertical flat transom adapted to accommodate an outboard motor thereon at its rear end and merging centrally at its forward end in a forwardly extending straight sloping stem, the chine between said hull portions lying substantially in a horizontal plane throughout the length thereof and being located above the normal displacement waterline of said hull, said lower hull portion having an included V angle between its straight sides of between about 110 and 150 degrees uniformly throughout its width and length for the rear two-thirds portion of the normal displacement waterline length but progressively decreasing in the forward third thereof to merge into said sloping stem and said upper hull portion flaring outwardly in the forward third thereof to provide side and forward overhangs and to merge at the central stem of said hull with each other, the sides of said lower hull portion also merging at said stem at substantially the same angle as said overhangs to provide desirable entrance and buoyancy characteristics while maintaining a smooth run of substantially uniform cross-section of said hull for rough water stability during planing of said hull, and a water ballast tunnel having its top beneath the static waterline of said hull and extending generally centrally along said hull and open at the transom of said hull with an air vent tube at its forward end having an open end above the static waterline of said hull, said tunnel having a cubic capacity accommodating a weight of water of between about 25 to 100 percent of the empty weight of said hull upon being automatically filled with water through its open end from water outside said hull when said hull is at rest and being automatically emptied of said water in dynamic operation of said hull.

3. A hull as claimed in claim 2 wherein said tunnel has a cubic capacity accommodating a weight of water of about 60 percent of said weight.

4. A high speed planing hull having a length to beam ratio of approximately three comprising a generally vertical sided upper hull portion and a generally V shaped lower hull portion, the upper and the V shaped lower hull portions intersecting at a chine, the hull having a bow portion comprising less than about one-half the overall length of the hull, the hull portion aft of the bow portion having a substantially constant V angle of approximately 130 degrees for all bottom sections, the V angle of the bottom of the bow portion decreasing progressively to the bow of the hull from the substantially constant V angle region of the aft portion and the upper portion of the bow portion of the hull flaring outwardly progressively to the bow to merge with the lower portion of the bow portion, the bottom sections throughout the hull portion aft of the bow portion being free of transverse curvature from the chine to the vicinity of the centerline of the hull and the bottom being substantially straight in said aft portion along lines parallel to the centerline of the hull and to the normal waterline of the hull when the hull is at rest to make all bottom sections in said aft portion substantially alike and to provide a straight run, the beam of said aft portion of the hull at the chine being greater than the waterline beam and the chine being above the normal waterline of the hull.

References Cited in the file of this patent

UNITED STATES PATENTS

| | | |
|---|---|---|
| 761,835 | Hickey | June 7, 1904 |
| 946,513 | Johnson | Jan. 11, 1910 |
| 1,033,220 | Westover | July 23, 1912 |
| 1,444,150 | Gadomski | Feb. 6, 1923 |
| 2,185,430 | Burgess | Jan. 2, 1940 |
| 2,488,183 | Garmont | Nov. 15, 1949 |
| 2,745,370 | Manis | May 15, 1956 |
| 2,757,629 | Wiltse | Aug. 7, 1956 |

FOREIGN PATENTS

| | | |
|---|---|---|
| 75,135 | Norway | May 23, 1949 |

UNITED STATES PATENT OFFICE
CERTIFICATE OF CORRECTION

Patent No. 3,085,535                                April 16, 1963

Charles R. Hunt

It is hereby certified that error appears in the above numbered patent requiring correction and that the said Letters Patent should read as corrected below.

Column 1, line 29, for "marges" read -- merges --; column 2, line 61, for "the", first occurrence, read -- that --; line 64, for "operation." read -- operation, --; column 3, line 41, for "planing" read -- planking --; line 74, for "to", second occurrence, read -- too --; column 4, line 8, for "6" read -- 62 --; line 25, for "planning" read -- planing --; column 6, line 8, for "at" read -- aft --.

Signed and sealed this 29th day of October 1963.

(SEAL)
Attest:

ERNEST W. SWIDER                            EDWIN L. REYNOLDS

Attesting Officer                             Acting Commissioner of Patents

Disclaimer 3,085,535.—*Charles R. Hunt*, Tilton, N.H. BOAT HULL. Patent dated Apr. 16, 1963. Disclaimer filed Aug. 17, 1970, by the assignee, *Hunt Industries, Inc.*

Hereby enters this disclaimer to claims 1 to 4 of said patent.

[*Official Gazette November 10, 1970.*]